US012651217B2

(12) United States Patent
Masood et al.

(10) Patent No.: US 12,651,217 B2
(45) Date of Patent: Jun. 9, 2026

(54) SYSTEMS AND METHODS FOR OPTIMIZING COMPETENCY ALIGNMENT USING HIGH-DIMENSIONAL EMBEDDING CENTRALITY WITH PROMINENCE INDEX

(71) Applicant: UST GLOBAL (SINGAPORE) PTE. LTD., Singapore (SG)

(72) Inventors: Adnan Masood, Temple Terrace, FL (US); Akhil Seth, San Francisco, CA (US); Omar Siddiqi, Tampa, FL (US)

(73) Assignee: UST GLOBAL (SINGAPORE) PTE. LTD., Singapore (SG)

( * ) Notice: Subject to any disclaimer, the term of this patent is extended or adjusted under 35 U.S.C. 154(b) by 147 days.

(21) Appl. No.: 18/486,342

(22) Filed: Oct. 13, 2023

(65) Prior Publication Data

US 2025/0124371 A1     Apr. 17, 2025

(51) Int. Cl.
*G06Q 10/0631* (2023.01)
*G06N 7/00* (2023.01)
*G06Q 10/1053* (2023.01)

(52) U.S. Cl.
CPC ....... *G06Q 10/063112* (2013.01); *G06N 7/00* (2013.01); *G06Q 10/1053* (2013.01)

(58) Field of Classification Search
None
See application file for complete search history.

(56) References Cited

U.S. PATENT DOCUMENTS

| | | | |
|---|---|---|---|
| 10,853,385 B1 * | 12/2020 | Truong | ................... G06N 3/045 |
| 2018/0103302 A1 * | 4/2018 | Bell | ...................... G06N 20/20 |
| 2018/0247271 A1 * | 8/2018 | Van Hoang | ........... G06F 16/951 |
| 2019/0318318 A1 * | 10/2019 | Sergott | .................... H04L 51/02 |
| 2019/0325029 A1 * | 10/2019 | Gandhi | ................. G06F 40/284 |
| 2020/0004835 A1 * | 1/2020 | Ramanath | ......... G06F 16/24578 |
| 2020/0356627 A1 * | 11/2020 | Pablo | ...................... G06F 40/30 |

(Continued)

FOREIGN PATENT DOCUMENTS

| | | | |
|---|---|---|---|
| CN | 106682734 A | * | 5/2017 |

OTHER PUBLICATIONS

Y. Shen and J. Liu, "Comparison of Text Sentiment Analysis based on Bert and Word2vec, " 2021 IEEE 3rd International Conference on Frontiers Technology of Information and Computer (ICFTIC), Greenville, SC, USA, 2021, pp. 144-147, doi: 10.1109/ICFTIC54370. 2021.9647258. (Year: 2021).*

(Continued)

*Primary Examiner* — Susanna M. Diaz
(74) *Attorney, Agent, or Firm* — NIXON PEABODY LLP

(57) ABSTRACT

A system is configured to: (a) provide a deep learning model; (b) receive a concept, the concept including text; (c) determine a word embedding representing the concept using the deep learning model; (d) determine a centroid for the concept, the centroid representing an average position of concept characteristics in a high-dimensional word embeddings space; (e) determine Euclidean distances for each of the concept characteristics; (f) determine cosine similarities for each of the concept characteristics; (g) determine a prominence index for each of the concept characteristics based on the determined Euclidean distances and the determined cosine similarities; and (h) provide, to a client device, a ranking of the concept characteristics based on the prominence index.

19 Claims, 2 Drawing Sheets

200

Provide a deep learning model
202

Receive a concept
204

Determine a word embedding representing the concept
206

Determine a centroid for the concept
208

Determine Euclidean distances associated with the concept
210

Determine cosine similarities associated with the concept
212

Determine prominence indexes based on the Euclidean distances and the cosine similarities
214

Provide a ranking of concept characteristics based on the prominence indexes
216

(56) References Cited

U.S. PATENT DOCUMENTS

| | | | |
|---|---|---|---|
| 2020/0364539 A1* | 11/2020 | Anisimov | G06F 3/011 |
| 2020/0402672 A1* | 12/2020 | Michelson | G16H 70/00 |
| 2021/0065126 A1* | 3/2021 | Bykov | G06Q 10/1053 |
| 2021/0097472 A1* | 4/2021 | Inamdar | G06Q 10/1053 |
| 2021/0224750 A1* | 7/2021 | Duan | G06F 16/9535 |
| 2021/0350078 A1* | 11/2021 | Choudhury | G06F 40/284 |
| 2021/0357835 A1* | 11/2021 | Modi | G06F 40/194 |
| 2021/0365873 A1* | 11/2021 | Zweig | G06F 18/231 |
| 2022/0051080 A1* | 2/2022 | Hajarnis | G06N 3/08 |
| 2022/0092514 A1* | 3/2022 | Guru | G06Q 10/1053 |
| 2022/0147903 A1* | 5/2022 | Yoshikawa | G06Q 10/1053 |
| 2022/0327488 A1* | 10/2022 | Ramani | G06N 5/02 |
| 2022/0366374 A1* | 11/2022 | Kundapur | G06F 40/30 |
| 2023/0008377 A1* | 1/2023 | Arai | G06F 3/04847 |
| 2024/0311735 A1* | 9/2024 | Malfiza Garcia de Macedo | G06Q 10/0639 |
| 2025/0005294 A1* | 1/2025 | Ochs | G06F 40/166 |
| 2025/0094718 A1* | 3/2025 | Yan | G06F 40/30 |

OTHER PUBLICATIONS

English Translation of CN_106682734_A. (Year: 2017).*

Younas, Muhammad, et al. "Extraction of Non-Functional Requirement Using Semantic Similarity Distance." Neural Computing and Applications (2020) 32:7383-7397. Published May 22, 2019. (Year: 2019).*

* cited by examiner

200

SYSTEMS AND METHODS FOR OPTIMIZING COMPETENCY ALIGNMENT USING HIGH-DIMENSIONAL EMBEDDING CENTRALITY WITH PROMINENCE INDEX

TECHNICAL FIELD

The present disclosure relates to computer-implemented systems for understanding latent meanings in concepts, and more specifically, to systems and methods for using high-dimensionality embedding centrality with prominence index for aligning and identifying qualities or characteristics associated with concepts.

BACKGROUND

Machine learning techniques are used in various applications for predicting future states of a system or for classifying information. In some instances, machine learning can help people make better decisions by incorporating factors that a human mind may not have considered. For example, humans may take into account a few salient factors when making a decision while a computer can take into account hundreds, if not thousands, of factors. Machine learning has been shown effective in image and speech recognition, automated trading strategies for financial instruments, learning associations to develop insights in consumer buying behavior, classifying consumers or objects into different categories, predicting a loan applicant's default risk, etc.

Machine learning techniques are valuable in document understanding systems and/or speech recognition and response systems. Understanding human representation of concepts can be a difficult problem, especially because current machine learning techniques and deep learning methods may not capture nuances and complexities of high-dimensional embedding spaces when analyzing a specific concept. For example, a concept may have certain associated qualities or characteristics, with some of those qualities or characteristics being more important than others. Similarly, these qualities or characteristics associated with the specific concept might present as synonyms or antonyms of other qualities and/or concepts. The present disclosure provides systems and methods for further tackling problems associated with dissecting and understanding concepts. Computing systems' further understanding of concepts can enable higher dimensional analysis, providing insights that may evade humans.

SUMMARY

According to some implementations of the present disclosure, a system for determining characteristics of a concept is provided. The system includes a processor and a non-transitory computer readable medium storing instructions such that when the instructions are executed by the processor, the system is configured to: (a) provide a deep learning model; (b) receive a concept, the concept including text; (c) determine a word embedding representing the concept using the deep learning model; (d) determine a centroid for the concept, the centroid representing an average position of concept characteristics in a high-dimensional word embeddings space; (e) determine Euclidean distances for each of the concept characteristics; (f) determine cosine similarities for each of the concept characteristics; (g) determine a prominence index for each of the concept characteristics based on the determined Euclidean distances and the determined cosine similarities; and (h) provide, to a client device, a ranking of the concept characteristics based on the prominence index.

According to some implementations of the present disclosure, a system for optimizing skill fitment in job descriptions is provided. The system includes a processor and a non-transitory computer readable medium storing instructions such that when the instructions are executed by the processor, the system is configured to: (a) provide a deep learning model; (b) receive the job description, the job description including job titles and/or roles and skills; (c) determine word embeddings representing the job titles, the roles, and/or the skills using the deep learning model; (d) determine a centroid for each job title or role, the centroid representing an average position of skills in a high-dimensional word embeddings space; (e) determine Euclidean distances for each of the skills with respect to each respective centroid; (f) determine cosine similarities for each of the skills with respect to each respective centroid; (g) determine a prominence index for each of the skills based on respective Euclidean distances and respective cosine similarities; and (h) provide a ranking of the skills for each of the job titles or roles based on the prominence index.

According to some implementations of the present disclosure, a method is provided. The method includes: (a) providing a deep learning model; (b) receiving a concept, the concept including text; (c) determining a word embedding representing the concept using the deep learning model; (d) determining a centroid for the concept, the centroid representing an average position of concept characteristics in a high-dimensional word embeddings space; (e) determining Euclidean distances for each of the concept characteristics; (f) determining cosine similarities for each of the concept characteristics; (g) determining a prominence index for each of the concept characteristics based on the determined Euclidean distances and the determined cosine similarities; and (h) providing, to a client device, a ranking of the concept characteristics based on the prominence index.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
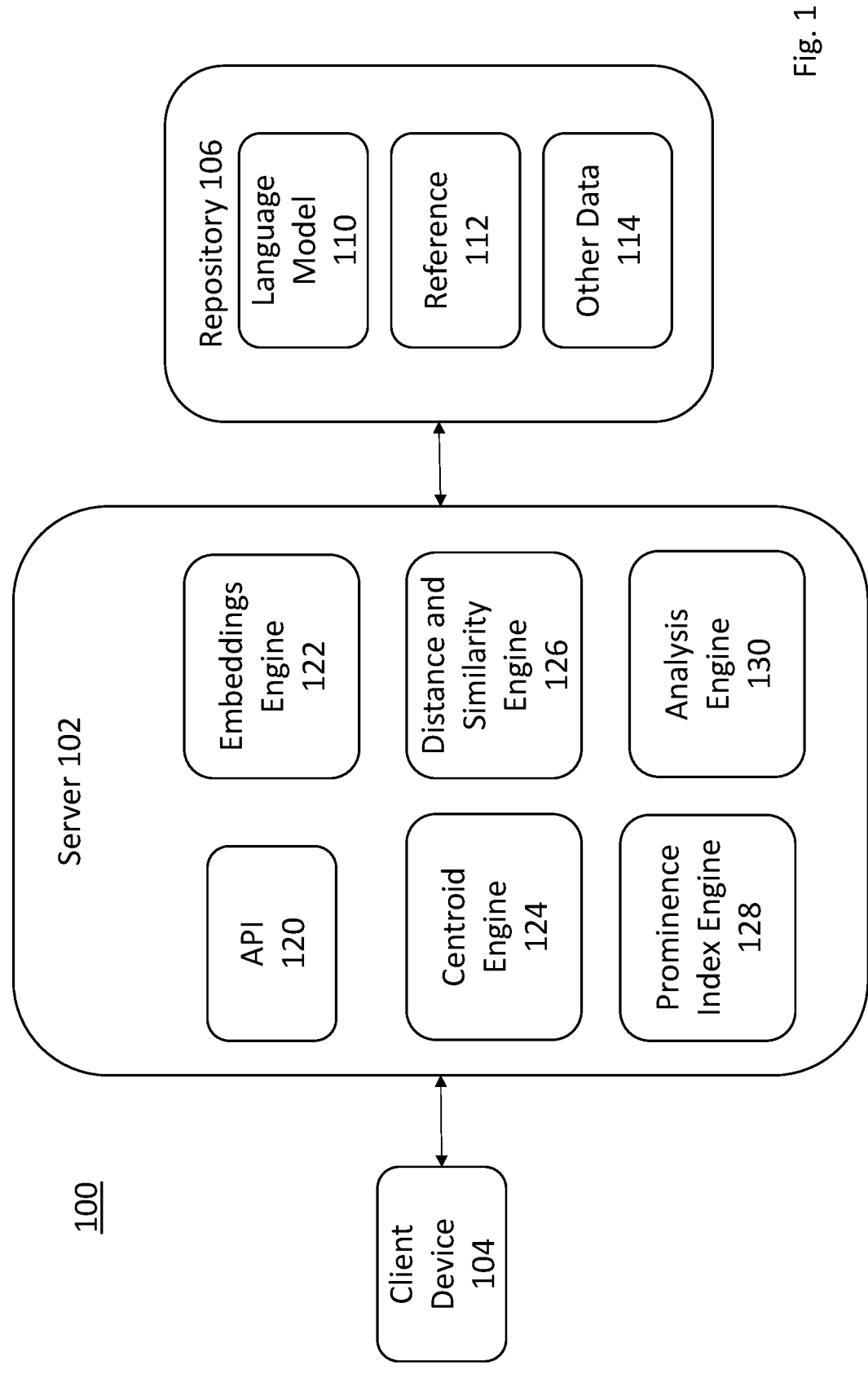
FIG. 1 illustrates a block diagram of a system for determining characteristics of a concept using a large language model, according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Machine learning techniques, being widely used in various applications, affect human lives and livelihood. Machine learning techniques are used in document understanding systems. Document understanding systems can take advantage of deep learning models which encode concepts in a high-dimensional word embedding space. Extracting latent meanings and information in these spaces can provide deep insight and connections that would be impossible for humans to glean from plain understanding. For example, when a company is hiring a chief executive officer, a machine learning algorithm can be used to select potential candidates. Latent understanding embedded in the machine learning algorithm may include selecting candidates that are over 6 ft tall even though this specific criterium was not explicit in the search parameters. Therefore, the search results provided by the machine learning algorithm may be skewed towards latent criteria that are not important to the specific skillset of a chief executive officer. Systems and methods of drawing out or illuminating latent meanings in machine learning algorithms is helpful. The previous example illustrated a latent meaning that may be unwanted, but there are other latent meanings that could be highlighted to provide further insights.

Embodiments of the present disclosure provide systems and methods for determining characteristics of a concept based on a deep learning model. The concept can be text, a job title, etc. Embodiments of the present disclosure use word embeddings representing the concept to search for related words or phrases around the concept. These related words or phases can then be ranked based on prominence indexes of the related words or phrases. The greater the prominence index, the more related the related words or phrases are to the concept. The prominence index is determined based on distance and cosine similarities between a centroid associated with the concept and the positions of the related words or phrases in a high-dimensional word embedding space of the deep learning model. Embodiments of the present disclosure improve computer technology by improving information extraction in knowledge base representations that may be missed using other information extraction methods. That is, the quality of information accessible and retrieved by computing systems is enhanced due to the ability of the computing systems to determine prominence indexes and make latent connections that are hidden from other information extraction methods.

Embodiments of the present disclosure can be used in a modern job market for understanding specific criteria and tailoring job descriptions. The modern job market demands accurate and effective job descriptions to attract the right talent and optimize skill fitment. Traditional methods for creating job descriptions and matching candidates with job openings often rely on manual processes or simple keyword matching techniques, which may not accurately capture the complex relationships between job titles, roles, and skills. With the increasing availability of natural language processing techniques and high-dimensional word embeddings, there is an opportunity to develop more advanced algorithms and methods for optimizing skill fitment in job descriptions.

Embodiments of the present disclosure provide an algorithm and a method for optimizing talent suitability in job descriptions using high-dimensional word embedding centrality with prominence indexes. The prominence index is an approximate equidistance measure of centrality that combines both cosine similarity and Euclidean distance features. This new measure allows for a more comprehensive analysis of the relationships between job titles, roles, and skills in the high-dimensional word embedding space, enabling the optimization of expertise appropriateness, competency alignment, proficiency suitability and the identification of outlier skills that may not be meet qualification fitness.

For example, by leveraging the power of high-dimensional word embeddings and the prominence index, embodiments of the present disclosure improve the process of creating job descriptions and matching candidates with job openings, ultimately leading to more efficient and effective talent acquisition and management.

FIG. 1 illustrates a block diagram of a system 100 for determining characteristics of a concept using a large language model, according to some implementations of the present disclosure. The system 100 includes a server 102, a client device 104, and one or more repositories 106 for storing information. The server 102 and the client device 104 are computing devices with at least one processor, memory, storage device, and network interface. Examples of the client device 104 include a laptop computer, a desktop computer, a smart phone, a tablet, a phablet, a personal digital assistant (PDA), a smart television, a smart speaker, etc. The server 102 can include one or more computing devices to perform functions described in the present disclosure.

The one or more repositories 106 can store a large language model or language model 110, reference data 112, or other data 114. The one or more repositories 106 can store intermediate calculations and other data used by the server 102. The one or more repositories 106 can be housed at a separate location from the server 102 and/or owned by a different entity than the server 102.

The server 102 is configured to receive data from the client device 104. The server 102 can store the received data in the repository 106. The data can include information associated with a concept, reference material, domain-specific knowledge, industry standards, user feedback, etc. The data received from the client device 104 can be the same as or similar to the reference data 112. The data received from the client device 104 can be stored as the reference data 112. In some implementations, the reference data 112 is data used to train the language model 110. The server 102 can provide rankings of related words or phrases based on the received data and/or the reference data 112. In some implementations, a user of the client device 104 can provide feedback to the server 102 based on the rankings of related words or phrases provided by the server 102. For example, the user of the client device 104 is working on a job posting and is trying to determine skills associated with a specific role or job title. The user of the client device 104 can receive from the server 102 a ranking of skills, and the user can modify the job posting based on the ranking provided by the server 102. In some implementations, the user of the client device 104 can add specific skills to the job posting or can remove unnecessary skills included in the job posting based on the ranking of skills.

The server 102 includes an application programming interface (API) 120, an embeddings engine 122, a centroid engine 124, a distance and similarity engine 126, a prominence index engine 128, and an analysis engine 130. Each of the API 120, the embeddings engine 122, the centroid engine 124, the distance and similarity engine 126, the prominence index engine 128, and the analysis engine 130 identified in FIG. 1 is a combination of hardware and software configured to perform specific functionality as described in the following paragraphs.

The API 120 of the server 102 facilitates communication between the client device 104 and the server 102. In some implementations, the API 120 also facilitates communication between the server 102 and the one or more repositories 106. The API 120 packages data packets to (and from) the client device 104, so that there is a bidirectional information flow between the server 102 and the client device 104. The API 120 can package information (e.g., feedback data, reference data, etc.) received from the client device 104 so that these provided information can be processed by the server 102. The API 120 can package the rankings determined by the server 102 such that the rankings are readable by the client device 104. In some implementations, the API 120 is a web service compatible with hypertext transfer protocol (HTTP) and machine-readable file formats such as extensible markup language (XML) and JavaScript object notation (JSON).

The embeddings engine 122 of the server 102 is configured to use the language model 110 to determine word embeddings for obtained data. For example, the language model 110 can be used by the embeddings engine 122 to determine word embeddings from data obtained from the client device 104. The embeddings engine 122 can determine word embeddings of a concept and related words or phrases associated with the concept. A concept and its related words or phrases are text. The concept can be a job title or role, and the related words or phrases can be skills associated with the job title or role. In some implementations, the embeddings engine 122 returns word embeddings specifically for data provided by the client device 104. In some implementations, the embeddings engine 122 returns word embeddings for data provided by the client device 104 and words or phrases determined from the high-dimensional embedding space associated with the language model 110.

The centroid engine 124 of the server 102 is configured to determine a centroid associated with the concept of interest provided to the embeddings engine 122. The centroid represents an average position of related words and phrases (i.e., concept characteristics) in the high-dimensional word embeddings space.

The distance and similarity engine 126 of the server 102 is configured to perform a distance analysis and a similarity analysis between the related words and phrases and the centroid associated with the concept. In some implementations, the distance analysis includes determining Euclidean distances between each of the related words and phrases and the centroid. In some implementations, the similarity analysis includes determining a cosine similarity between each of the related words and phrases and the centroid.

The prominence index engine 128 of the server 102 is configured to determine a prominence index for each of the related words and phrases (i.e., each concept characteristic) based on the results from distance analysis and similarity analysis. For example, the prominence indexes can be calculated using respective Euclidean distances and cosine similarities.

The analysis engine 130 of the server 102 is configured to perform the ranking of the related words or phrases based on the prominence indexes determined by the prominence index engine 128. The analysis engine 130 can further identify outliers in the data provided by the client device 104. For example, the client device 104 can provide a job listing with five skills associated with a job title. The analysis engine 130 can determine that the fourth skill is an outlier based on the prominent index of the fourth skill being below a threshold. Thus, the analysis engine 130 can highlight that the fourth skill should be removed from the job listing. In some implementations, the prominence index takes on a value between 0 and 1. A prominence index value below a threshold of 0.5 or 0.6 can be determined to be unimportant for the identified job title (i.e., the concept).

Embedding centrality and positional prominence can play an important role in determining the validity of a concept characteristic at the center of a high-dimensional word embedding cluster. Using the job market as an example, identifying the best collection of skills that describe a job title or role in such high-dimensional word embedding clusters can be a challenging task. Current methods for optimizing skill fitment in job descriptions may not be able to capture the nuances and complexities of higher-dimensional embedding spaces. Embodiments of the present disclosure thus propose systems and methods for optimizing skill fitment using an outlier-resistant approximate equidistance measure of centrality and combining both cosine similarity and Euclidean distance features as a prominence index.

High-dimensional word embeddings have become a popular tool for capturing nuanced relationships between words in natural language. These embeddings represent words as points in a high-dimensional space, where semantically similar words are positioned close together. The embedding centrality (i.e., the centroid determined by the centroid engine 124) and positional prominence of a word or phrase in this high-dimensional space can provide valuable insights into the word or phrase's importance or relevance within the context of one or more concepts.

In the context of job descriptions, embedding centrality and positional prominence can be used to identify the most relevant skills for a given job title or role. By analyzing the relationships between job titles, roles, and skills in the high-dimensional word embedding space, it is possible to optimize skill fitment and create more effective job descriptions. Existing methods for analyzing high-dimensional spaces may not fully capture the nuances and complexities of the relationships extracted via centrality analysis and prominence indexes.

Figure 2:
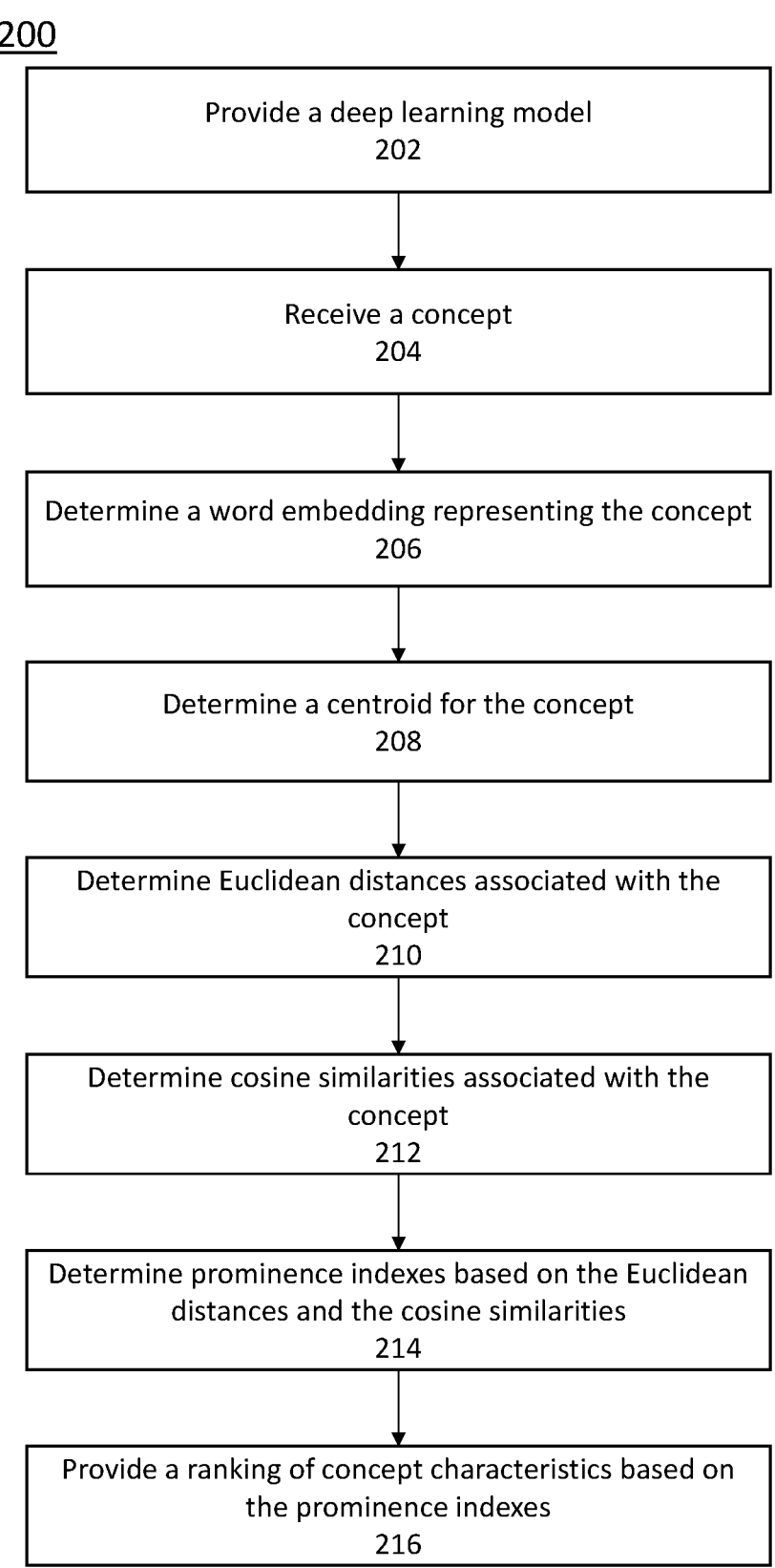
FIG. 2 illustrates a process for determining characteristics of a concept, according to some implementations of the present disclosure.

FIG. 2 illustrates a process 200 for determining characteristics of a concept, according to some implementations of the present disclosure. The process 200 is performed by the server 102. At step 202, the server 102 provides a deep learning model (e.g., the language model 110). The language model 110 can be GloVe, Word2Vec, or BERT. The language model 110 can be received from the repository 106 and/or the client device 102. The language model 110 provides a model for representing words in a high-dimensional space. High-dimensional word embeddings are numerical representations of words as points in a high-dimensional space, where semantically similar words are positioned close together. In high-dimensional word embedding spaces, a continuous vector space is used to represent words or phrases as high-dimensional vectors. These vectors capture the semantic and syntactic relationships between words or phrases, enabling efficient encoding and analysis of text data. The dimensionality of the vector space can range from tens to thousands, depending on the chosen embedding model.

At step 204, the server 102 receives data associated with one or more concepts (e.g., from the reference data 112, from the client device 104, from other data 114, etc.). In some implementations, the reference data 112 includes a database of job descriptions. For example, the job description can include job titles, roles, and skills. In some implementations, the job description is a draft job description provided by the user of the client device 104.

At step 206, the server 102 determines word embeddings representing the one or more concepts from step 204. In some implementations, the server 102 also determines word embeddings from concept characteristics included in the data received at step 204. For example, the concept received at step 204 can be a job title or role, and concept characteristics can include skills associated with the job title or role.

In an example, a word embedding model is Word2Vec, which learns continuous vector representations for words based on their co-occurrence patterns in a large corpus of text. Given a large corpus of text, the Word2Vec model optimizes a neural network to predict a target word based on its surrounding words (Skip-gram) or surrounding words based on the target word (Continuous Bag of Words—CBOW). Consider an example illustrating the concept of high-dimensional word embedding space. Suppose there is a vocabulary of only three words: "king," "queen," and "throne." Representing these words in a 2-dimensional word embedding space may look like:

king→(1.2, 3.1)

queen→(1.3, 3.0)

throne→(0.1, 1.2)

In this example, "king" and "queen" have similar embeddings, indicating a close semantic relationship, while "throne" has a different embedding, reflecting a more distant relationship.

At step 208, the server 102 determines centroids for the one or more concepts from step 204. The centroid represents an average position of concept characteristics in a high-dimensional word embedding space. In some implementations, the centroid represents the central concept for the job title or role. Centrality is a measure of the importance or prominence of a word or concept within the context of other words or concepts in the high-dimensional word embedding space. High centrality indicates that the word or concept is at the core of the cluster. In some embodiments, the centroid is the average position of all related skills in the space, providing a central point for analysis.

At step 210, the server 102 determines Euclidean distances associated with the concept. The Euclidean distances for each of the concept characteristics are determined. The Euclidean distance between two vectors a and b is given by:

$$d(a, b) = \sqrt{\sum_{i=1}^{n}(a_i - b_i)^2} \qquad \text{Eqn. 1}$$

For example, the Euclidean distance between the word embeddings of "king" and "queen" can be calculated as follows:

$$d(\text{king, queen}) = \sqrt{(1.2 - 1.3)^2 + (3.1 - 3.0)^2} \approx 0.1414$$

The Euclidean distance can be normalized by dividing it by the maximum possible distance in the embedding space (i.e., $d_{max} = \sqrt{n}$), where n is the dimension of the word embeddings. The normalized Euclidean distance is then:

$$d_{norm}(a, b) = \frac{d(a, b)}{d_{max}} \qquad \text{Eqn. 2}$$

At step 212, the server 102 determine cosine similarities associated with he concept. The cosine similarities for each of the concept characteristics are determined. The cosine similarity between two vectors a and b is given by:

$$\cos(a, b) = \frac{a \cdot b}{|a||b|} \qquad \text{Eqn. 3}$$

For example, the cosine similarity between the word embeddings of "king" and "queen" can be calculated as follows:

$$\cos(\text{king, queen}) = \frac{1.2 \times 1.3 + 3.1 \times 3.0}{\sqrt{(1.2^2 + 3.1^2)} \times \sqrt{(1.3^2 + 3.0^2)}} \approx 0.9985$$

In the high-dimensional word embedding space, words with similar meanings will have close vector representations, while words with dissimilar meanings will have distant vector representations. This property allows performing various natural language processing tasks, such as word analogy, and more, using simple mathematical operations on the word embeddings.

At step 214, the server 102 determines prominence indexes based on the Euclidean distances from step 210 and the cosine similarities from step 212. The prominence index based on the harmonic mean can be calculated as follows:

$$PI_H(a, b) = \frac{2 \times d_{norm}(a, b) \times \cos(a, b)}{d_{norm}(a, b) + \cos(a, b)} \qquad \text{Eqn. 4}$$

The range of the prominence index as provided in Eqn. 4 is from 0 to 1. In an example, the prominence index is an approximate equidistance measure of centrality that combines both cosine similarity and Euclidean distance features. The prominence index is used to analyze the relationships between job titles, roles, and skills in the high-dimensional word embedding space and to optimize skill fitment in job descriptions. The prominence index score represents the degree of relevance or fit between a skill and a job title in the high-dimensional word embedding space, with a higher value indicating a better fit and a lower value indicating a weaker fit or less relevance. A prominence index score close to 1 signifies that the skill is highly relevant to the job title, and the skill is considered a strong match for the role. In this case, the skill is likely to be an essential requirement or a core competency for the job. A prominence index score close to 0 indicates that the skill has very little relevance to the job title, and the skill is considered a weak match or even an outlier for the role. In this case, the skill may not be a suitable or a necessary requirement for the job.

The prominence index is resilient to outliers as an equidistant measure between skills and job description title, and using the harmonic mean of the normalized Euclidean distance and cosine similarity is one way of determining prominence index. The harmonic mean is less sensitive to large outliers and provides a more balanced measure of the distance. By using the harmonic mean of the normalized Euclidean distance and cosine similarity, the prominence index takes into account both the magnitude of differences and the orientation of the vectors in the embedding space. This combined measure is more resilient to outliers, as it down-weighs the effect of large differences in either of the distance measures.

At step 216, the server 102 provides a ranking of concept characteristics based on the prominence indexes. By using the prominence index score, it becomes easier to identify the most important and relevant skills for a particular job title, while also helping to detect outlier skills that may not be a good fit for the role. In some implementations, the analysis engine 130 is configured to identify skills that are a good fit for the job title or role based on the magnitude of the prominence index scores. Skills with high prominence index scores are considered to be more relevant and better suited to the job title or role.

The analysis engine 130 can be further configured to detect outlier skills. For example, outlier skills that may not be a good fit for the job title or role can be detected due to their low aggregate prominence index scores. Detection of outlier skills provides explainability for outlier status of certain skills, helping users (e.g., the user of the client device 104) understand why these skills may not be suitable.

The analysis engine 130 can be further configured to calculate fitment scores. In some implementations, the analysis engine 130 determines that prominence index scores are an overall fitment score for the corresponding job and individual scores for each skill's fitment. In some implementations, the prominence index values can be used to inform the optimization of job descriptions, candidate matching, and skill gap analysis. The prominence index can help with identifying most relevant skills for a job title or role, allowing for the system 100 to suggest edits to the job description by modifying (i.e., removing or adding) skills to the job description based on the prominence index scores.

In some implementations, based on a comparison of candidate profiles (e.g., resumes) with optimized job descriptions, the system 100 can better select candidates that match the optimized job descriptions. Thus, outlier skills can be suppressed in the matching process, providing better candidate matching for the job titles or roles.

The following paragraphs illustrate some capabilities of some embodiments of the present disclosure.

Example 1

A demonstration of calculating the prominence index using the harmonic mean of normalized Euclidean distance and cosine similarity for outlier resistance is provided. The job description title "data scientist" and skills such as python, pandas, jupyter, and EDA are provided as a working example. The aim is to demonstrate how these skills have a high prominence index score because the skills are conceptually related skills in the high dimensional word embedding space. The goal is to show how the relatedness of these skills leads to a higher PI score, indicating a good fit for the job title. The following embeddings are determined at step 206:

$$data\_scientist = (0.8, 0.5, 0.6)$$
$$python = (0.85, 0.55, 0.65)$$
$$pandas = (0.9, 0.6, 0.7)$$

10

-continued
$$jupyter = (0.75, 0.4, 0.55)$$
$$EDA = (0.7, 0.3, 0.4)$$

At step 208, the centroid for the concept can be determined to be the coordinates for data_scientist.

At step 210, the normalized Euclidean distance is determined for each skill with respect to the job title. Using Eqn. 2, $d_{norm}$ can be calculated for the various skills. That is, $d_{norm}$(data_scientist, python), $d_{norm}$(data_scientist, pandas), $d_{norm}$(data_scientist, jupyter), and $d_{norm}$(data_scientist, EDA) can be calculated.

At step 212, the cosine similarity for each skill with respect to the job title can be determined. Using Eqn. 3, cos(data_scientist, python), cos(data_scientist, pandas), cos(data_scientist, jupyter), and cos(data_scientist, EDA) can be calculated.

At step 214, the prominence index for each skill is determined using the harmonic mean following Eqn. 4. That is, $PI_H$(data_scientist, python), $PI_H$(data_scientist, pandas), $PI_H$(data_scientist, jupyter), and $PI_H$(data_scientist, EDA) can be calculated.

At step 216, a ranking of the prominence indexes can be provided. The higher the prominence index score, the better the fit between the skills and the job title. The harmonic mean-based prominence index calculation is more resistant to outliers, as it is less sensitive to extreme values in either distance or similarity measures. An analysis of the prominence index scores can be performed. Table 1 provides example calculations based on the values provided above.

TABLE 1

| | Prominence Index for Skills in Example 1 | | |
|---|---|---|---|
| Skill | Normalized Euclidean Distance | Cosine Similarity | Prominence Index |
| Python | 0.25 | 0.92 | 0.46 |
| Pandas | 0.35 | 0.87 | 0.54 |
| Jupyter | 0.40 | 0.85 | 0.58 |
| EDA | 0.38 | 0.88 | 0.56 |

As provided in Table 1, the prominence indexes indicate that the Jupyter skill has the highest PI score and is, therefore, the most relevant to the job title "Data Scientist." The other skills, Pandas, Python, and EDA, also have relatively high PI scores, indicating their strong relevance to the job title as well. By calculating the prominence index for each skill, insights on how relevant each skill is to the job title can be understood, and potential outlier skills that may not be a good fit can be identified. This information can be used to optimize job descriptions and improve candidate matching processes. As provided in the example above, prominence indexes can be used for better rankings of skill fit, thus providing better search results that can be used to further tailor job descriptions.

Example 2

In a second example, given a job title, "Java Developer," and a set of skills including Java, Spring Boot, J2EE, JVM, and Python, the prominence index score can help differentiate between highly relevant and less relevant skills for the job title in the high-dimensional word embedding space. In particular, Java, Spring Boot, J2EE, and JVM will be shown to have high prominence index scores, indicating a strong fit for the role, while Python will have a low prominence index score, suggesting Python is not a closely related skill in the high-dimensional word embedding space. Even though Python and Java are both programming languages and may be closely related in the high-dimensional word embedding space, embodiments of the present disclosure can be used to determine that Python is not a suitable fit for the job title "Java Developer," resulting in the low prominence index score associated with Python. The following parameters provided in Table 2 are assumed for the various skills with respect to the job title.

TABLE 2

Parameters for various skills in a job posting for Java Developer

| Skill | Normalized Euclidean Distance | Cosine Similarity |
|---|---|---|
| Java | 0.05 | 0.95 |
| Spring Boot | 0.10 | 0.90 |
| J2EE | 0.12 | 0.88 |
| JVM | 0.14 | 0.86 |
| Python | 0.40 | 0.60 |

Using the parameters in Table 2 and Eqn. 4, the prominence index calculations can be made for each of the skills providing $PI_{Java} \approx 0.904$, $PI_{Spring\ Boot} \approx 0.818$, $PI_{J2EE} \approx 0.790$, $PI_{JVM} \approx 0.762$, and $PI_{Python} \approx 0.480$. The prominence index scores for Java, Spring Boot, J2EE, and JVM are all relatively high, indicating a good fit for the Java Developer role. In contrast, Python has a significantly lower PI score, which suggests that it is less relevant to the Java Developer job title. Although Python and Java are both programming languages and share similarities in the high-dimensional word embedding space, Python's low prominence index score indicates that it is not a good fit for a Java Developer role.

Embodiments of the present disclosure improve upon the prior art. The prominence index is a novel measure that combines both normalized Euclidean distance and cosine similarity using harmonic means. This unique combination provides a more accurate and robust measure for assessing the relationship between skills and job titles or roles, as it leverages the strengths of both distance and similarity measures while also being resilient to outliers. The method employs higher-dimensional word embeddings, which capture more semantic and contextual information compared to lower-dimensional representations. By operating in this high-dimensional space, the method can more effectively discern subtle distinctions between skills and their relevance to specific job titles or roles.

Some embodiments of the present disclosure focus on determining the centrality of skills within the high-dimensional word embedding space. This approach provides a more objective and data-driven way of assessing skill fitment, as it takes into account the relationships between skills and their surrounding context, rather than relying solely on predefined rules or assumptions. The method includes a robust outlier analysis process, which can identify skills that may not be a good fit for a particular job title or role due to their low aggregate scores. This analysis provides valuable insights for improving job descriptions, candidate matching processes, and skill gap analysis. By leveraging high-dimensional word embeddings and the prominence index, embodiments of the present disclosure aim to improve the process of creating job descriptions and matching candidates with job openings, ultimately leading to more efficient and effective talent acquisition and management.

Embodiments of the present disclosure provide several advantages. For example, embodiments of the present disclose can improve explainability of deep learning models. Using the job search example, embodiments of the present disclosure not only identifies outlier skills but also provides insights into why these skills are outliers. This explainability aspect helps in understanding the underlying reasons behind the discrepancy, allowing for better decision-making and improvement of job descriptions or matching processes. This improves computer technology by allowing computing systems to provide insights to opaque deep learning models. Therefore, computing systems that incorporate some embodiments of the present disclosure can provide better search results and insights into the reasoning as to why the results are the way they are. Such features are not present in conventional systems.

Embodiments of the present disclosure are scalable and adaptable to various industries and domains. By incorporating domain-specific knowledge, industry standards, or user feedback, the method can be fine-tuned to better suit the unique requirements of different sectors and job roles, making it more widely applicable and valuable.

The prominence index can offer a single, unified measure for assessing the fitment of skills to job titles or roles. This unified measure simplifies the evaluation process and facilitates easier comparison across various skills and job roles, making it a more practical and efficient solution for various applications, such as candidate matching, job description improvement, or skill gap analysis.

As mentioned above, the potential applications of embodiments of the present disclosure extend far beyond the optimization of skill fitment for job titles and roles. For example, the prominence index can be applied in education and curriculum development, career guidance, skill gap analysis, talent acquisition, competency management, market research, online learning platforms, and job search platforms. Broad applicability of some embodiments across multiple industries and domains demonstrates the significant impact on workforce development, education, and career planning that can be realized.

According to some embodiments of the present disclosure, processes described above with reference to flow charts or flow diagrams (e.g., in FIG. 2) may be implemented in a computer software program. For example, some embodiments of the present disclosure include a computer program product, which includes a computer program that is carried in a computer readable medium. The computer program includes program codes for executing the method 200. The computer program may be downloaded and installed from a network (e.g., the Internet, a local network, etc.) and/or may be installed from a removable medium (e.g., a removable hard drive, a flash drive, an external drive, etc.). The computer program, when executed by a central processing unit implements the above functions defined by methods and flow diagrams provided herein in the present disclosure.

A computer readable medium according to the present disclosure may be a computer readable signal medium or a computer readable storage medium or any combination of the above two. Examples of the computer readable storage medium may include electric, magnetic, optical, electromagnetic, infrared, or semiconductor systems, elements, apparatuses, or a combination of any of the above. More specific examples of the computer readable storage medium include a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above.

The computer readable storage medium according to some embodiments may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in the present disclosure may be compiled using one or more programming languages or combinations thereof. The programming languages include object-oriented programming languages, such as Java or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or electronic device. In the circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. Each of the blocks in the flow charts or block diagrams may represent a program segment or code that includes one or more executable instructions for implementing specified logical functions. It should be further noted that, in some alternative implementations, the functions denoted by the flow charts and block diagrams may also occur in a sequence different from the sequences shown in the figures. For example, any two blocks presented in succession may be executed substantially in parallel, or sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

Engines, handlers, generators, managers, or any other software block or hybrid hardware-software block identified in some embodiments of the present disclosure may be implemented by software, or may be implemented by hardware. The described blocks may also be provided in a processor.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A system for document revision, the system comprising a processor and a non-transitory computer readable medium storing instructions such that when the instructions are executed by the processor, the system is configured to:

provide a deep learning model, the deep learning model representing words as vectors, each vector including at least a thousand dimensions;

receive a document including a concept and concept characteristics associated with the concept, the concept and concept characteristics including text for probing the deep learning model;

determine word embeddings representing the concept and the concept characteristics using the deep learning model;

determine a centroid for the concept based at least in part on the concept characteristics, the centroid representing an average position of the concept characteristics in a high-dimensional word embeddings space;

determine Euclidean distances for each of the concept characteristics with respect to the centroid;

determine cosine similarities for each of the concept characteristics with respect to the centroid;

determine a prominence index for each of the concept characteristics based on the determined Euclidean distances and the determined cosine similarities, each prominence index being a harmonic mean of a corresponding Euclidean distance and a corresponding cosine similarity;

provide, to a client device, a ranking of the concept characteristics based on the prominence index, the ranking including a highest ranking concept characteristic being the most relevant concept characteristic; and provide, to the client device, an identified concept characteristic to be removed from the document based on the prominence index associated with the identified concept characteristic being less than a threshold, wherein the document is revised to remove the identified concept characteristic.

2. The system of claim 1, wherein the deep learning model includes GloVe, Word2Vec, or BERT.

3. The system of claim 1, wherein a first concept characteristic and a second concept characteristic are received from the client device, the system being further configured to: determine that the second concept characteristic is an outlier for the concept, the outlier being the identified concept characteristic to be removed from the document.

4. The system of claim 1, wherein the concept is received from the client device or a database.

5. The system of claim 1, wherein the concept is a job title or role, and wherein the concept characteristics include skills associated with the job title or role.

6. The system of claim 5, wherein the concept and at least one of the concept characteristics are received via a draft job posting, the document being the draft job posting.

7. The system of claim 6, further configured to: provide, to the client device, an identified concept characteristic absent from the job posting.

8. The system of claim 6, further configured to:

receive a candidate profile including one or more skills; and determine a fitment score for the candidate profile based on the ranking of the concept characteristics.

9. The system of claim 6, further configured to:

receive a candidate profile including one or more skills; and determine a skill gap between the candidate profile and the job title or role.

10. The system of claim 1, further configured to:

obtain, from the deep learning model using continuous bag of words, at least one word associated with the concept characteristics and the concept, wherein the at least one word is extracted from the high-dimensional word embeddings space; and provide, to the client device, the at least one word as a suggested edit to the document.

11. The system of claim 1, further configured to:

normalize each of the Euclidean distances to a normalized Euclidean distance having a value between zero and one, wherein the prominence index for each of the concept characteristics is based on the normalized Euclidean distances.

12. A system for optimizing skill fitment in job descriptions, the system comprising a processor and a non-transitory computer readable medium storing instructions such that when the instructions are executed by the processor, the system is configured to:

provide a deep learning model, the deep learning model representing words as vectors, each vector including at least a thousand dimensions;

receive a job description, the job description including job titles and/or roles and skills;

determine word embeddings representing the job titles, the roles, and/or the skills using the deep learning model;

determine a centroid for each job title or role based at least in part on the skills associated with the job titles or roles, the centroid representing an average position of skills in a high-dimensional word embeddings space;

determine Euclidean distances for each of the skills with respect to each respective centroid;

determine cosine similarities for each of the skills with respect to each respective centroid;

determine a prominence index for each of the skills as a harmonic mean of respective Euclidean distances and respective cosine similarities; and provide a ranking of the skills for each of the job titles or roles based on the prominence index, the ranking for each of the job titles or roles including a highest ranking skill being a most relevant skill; and provide an identified skill for at least one of the job titles or roles to be removed from the job description based on the prominence index associated with the identified skill being less than a threshold; and revise the job description to remove the identified skill to obtain a revised job description.

13. A method comprising:

providing a deep learning model, the deep learning model representing words as vectors, each vector including at least a thousand dimensions;

receiving a document including a concept and concept characteristics associated with the concept, the concept and concept characteristics including text for probing the deep learning model;

determining word embeddings representing the concept and the concept characteristics using the deep learning model;

determining a centroid for the concept based at least in part on the concept characteristics, the centroid representing an average position of the concept characteristics in a high-dimensional word embeddings space;

determining Euclidean distances for each of the concept characteristics with respect to the centroid;

determining cosine similarities for each of the concept characteristics with respect to the centroid;

determining a prominence index for each of the concept characteristics based on the determined Euclidean distances and the determined cosine similarities, each prominence index being a harmonic mean of a corresponding Euclidean distance and a corresponding cosine similarity;

providing, to a client device, a ranking of the concept characteristics based on the prominence index, the ranking including a highest ranking concept characteristic being the most relevant concept characteristic; and provide, to the client device, an identified concept characteristic to be removed from the document based on the prominence index associated with the identified concept characteristic being less than a threshold, wherein the document is revised to remove the identified concept characteristic.

14. The method of claim 13, wherein the deep learning model includes GloVe, Word2Vec, or BERT.

15. The method of claim 13, wherein a first concept characteristic and a second concept characteristic are received from the client device, the system being further configured to: determine that the second concept characteristic is an outlier for the concept, the outlier being the identified concept characteristic to be removed from the document.

16. The method of claim 13, wherein the concept is a job title or role, and wherein the concept characteristics include skills associated with the job title or role.

17. The method of claim 16, wherein the concept and at least one of the concept characteristics are received via a draft job posting, the document being the draft job posting.

18. The method of claim 17, further comprising:

receiving a candidate profile including one or more skills; and determining a fitment score for the candidate profile based on the ranking of the concept characteristics.

19. The method of claim 13, further comprising:

obtaining, from the deep learning model using continuous bag of words, at least one word associated with the concept characteristics and the concept, wherein the at least one word is extracted from the high-dimensional word embeddings space; and providing, to the client device, the at least one word as a suggested edit to the document.

* * * * *